(12) United States Patent
DiVerde et al.

(10) Patent No.: US 6,416,018 B2
(45) Date of Patent: *Jul. 9, 2002

(54) SATELLITE DISPENSER

(75) Inventors: Michael B. DiVerde, Rancho Santa Margarita; Kenneth N. Telford, Huntington Beach; George J. Budris, Huntington Beach; Christopher M. Gil, Huntington Beach; John F. Steinmeyer, Orange, all of CA (US)

(73) Assignee: The Boeing Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/273,844

(22) Filed: Mar. 22, 1999

Related U.S. Application Data

(63) Continuation-in-part of application No. 08/715,128, filed on Sep. 17, 1996, now Pat. No. 5,884,866.

(51) Int. Cl.[7] .................................................. B64G 1/10
(52) U.S. Cl. ............................... 244/137.1; 244/158 R; 244/161
(58) Field of Search ......................... 244/137.1, 158 R, 244/118.1, 161

(56) References Cited

U.S. PATENT DOCUMENTS

| | | |
|---|---|---|
| 2,925,965 A | 2/1960 | Pierce |
| 2,938,686 A | 5/1960 | Van Winkle et al. |

(List continued on next page.)

OTHER PUBLICATIONS

Photograph of "Dispenser system developed for Starsem's Globalstar mission carries four satellites", date unknown.

Photograph of "Satellite dispenser system for Starsem is produced from aluminum and weighs 390 kg.", date unknown.

Primary Examiner—Galen L. Barefoot
(74) Attorney, Agent, or Firm—Harness Dickey & Pierce P. L. C.

(57) ABSTRACT

A satellite dispenser adapted to be coupled to a launch vehicle. The dispenser includes a single-piece, integrally formed tubular shell for supporting a plurality of independent satellites thereon. The tubular shell is significantly lighter than multi-piece dispenser shells that require a connecting ring for coupling the post portion and base portion of the shell together. The single piece shell also significantly reduces the cost and simplifies the manufacture of the dispenser shell. The dispenser shell, in certain preferred embodiments, includes a tapered post portion which enables satellites being carried on the upper portion of the post portion to extend further into a fairing disposed over the satellites and dispenser shell during flight, thus making more efficient use of the envelope defined by the interior area of the fairing. A frusto-conical base portion integrally formed with the post portion enables the load supported by the dispenser shell to be evenly distributed throughout the base portion. The single-piece design also significantly improves the bending stress resistance of the dispenser and its overall structural rigidity. The various preferred embodiments each include a plurality of circular frames which are secured to an interior surface of the dispenser shell. A plurality of interface fittings are secured to an exterior surface of the dispenser shell and support a plurality of satellites thereon.

26 Claims, 12 Drawing Sheets

U.S. PATENT DOCUMENTS

| | | | |
|---|---|---|---|
| 2,958,260 A | | 11/1960 | Anderson |
| 2,976,806 A | | 3/1961 | Risk et al. |
| 3,107,616 A | | 10/1963 | Boaz et al. |
| 3,380,687 A | * | 4/1968 | Wrench et al. ......... 244/158 R |
| 3,461,801 A | | 8/1969 | Vitale et al. |
| 3,712,229 A | | 1/1973 | Schock |
| 3,726,223 A | | 4/1973 | Moe |
| 3,907,225 A | | 9/1975 | Welther |
| 3,948,175 A | | 4/1976 | Bucklisch |
| 4,044,974 A | | 8/1977 | Lingley et al. |
| 4,067,308 A | | 1/1978 | Anderson et al. |
| 4,106,389 A | | 8/1978 | Walley |
| 4,233,882 A | | 11/1980 | Eichweber |
| 4,298,178 A | | 11/1981 | Hujsak |
| 4,372,216 A | | 2/1983 | Pinson et al. |
| 4,444,117 A | | 4/1984 | Mitchell, Jr. |
| 4,506,852 A | | 3/1985 | Adams et al. |
| 4,558,645 A | | 12/1985 | Boeder et al. |
| 4,625,646 A | | 12/1986 | Pinson |
| 4,679,752 A | | 7/1987 | Whittmann et al. |
| 4,682,744 A | * | 7/1987 | Gounder ................. 244/158 R |
| 4,957,046 A | | 9/1990 | Puttock |
| 5,040,748 A | | 8/1991 | Torre et al. |
| 5,107,767 A | | 4/1992 | Schneider et al. |
| 5,125,601 A | | 6/1992 | Monford, Jr. |
| 5,199,672 A | | 4/1993 | King et al. |
| 5,411,226 A | | 5/1995 | Jones et al. |
| 5,566,909 A | * | 10/1996 | Lapins ................... 244/158 R |
| 5,605,308 A | | 2/1997 | Quan et al. |
| 5,613,653 A | | 3/1997 | Bombled et al. |
| 5,720,450 A | | 2/1998 | Kanne |
| 5,779,195 A | | 7/1998 | Basuthakur et al. |
| 5,860,624 A | | 1/1999 | Obry et al. |
| 5,884,866 A | | 3/1999 | Steinmeyer et al. |

* cited by examiner

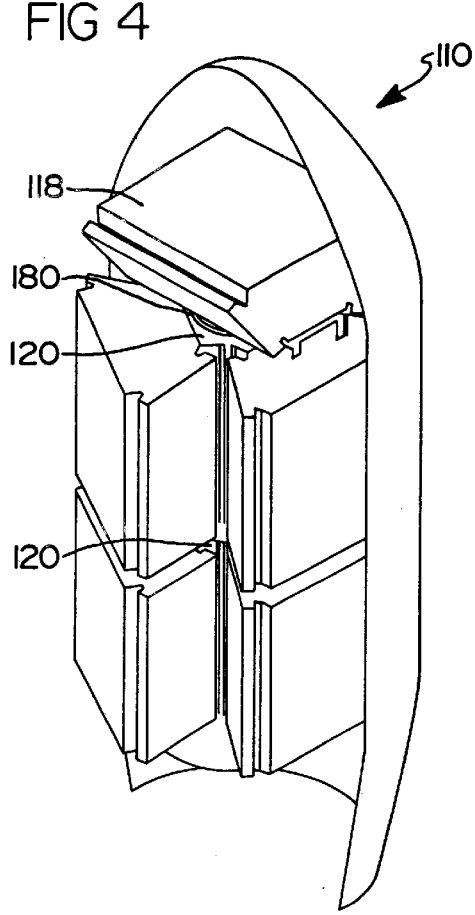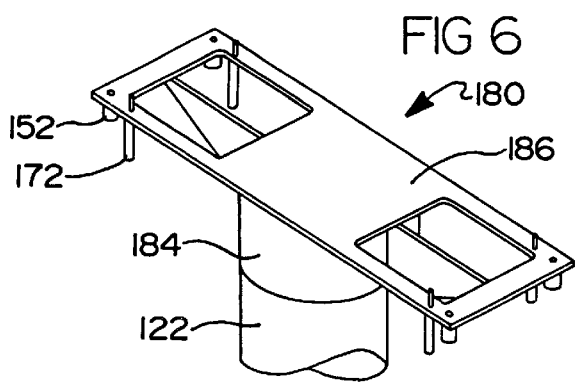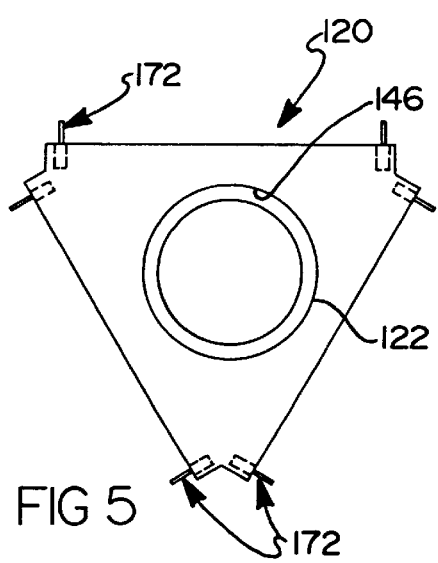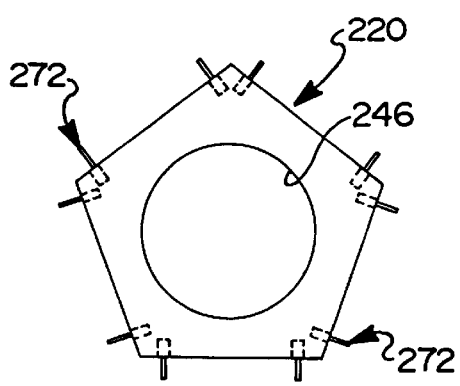

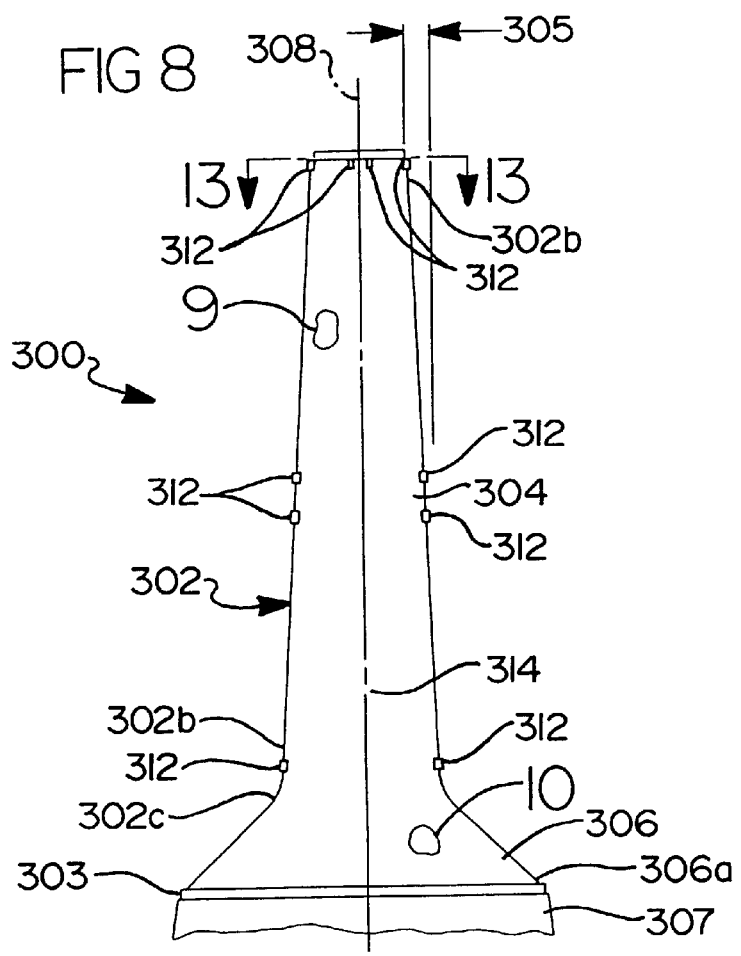
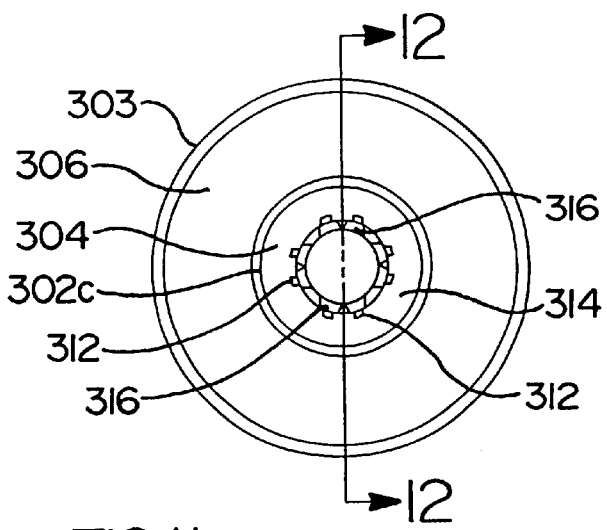

FIG 9  ORTHOTROPIC
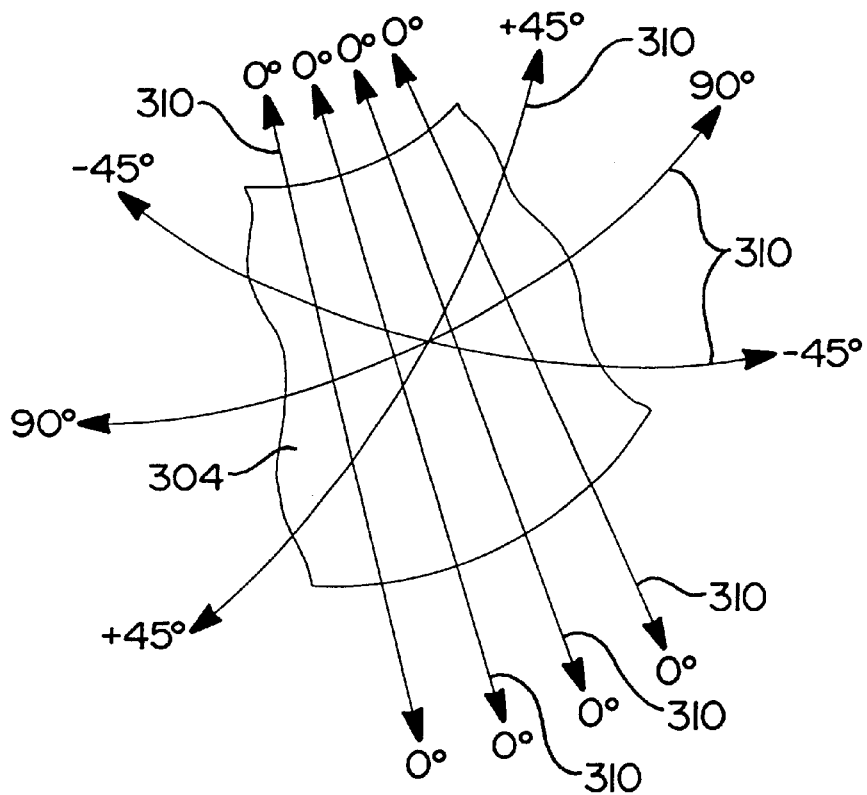
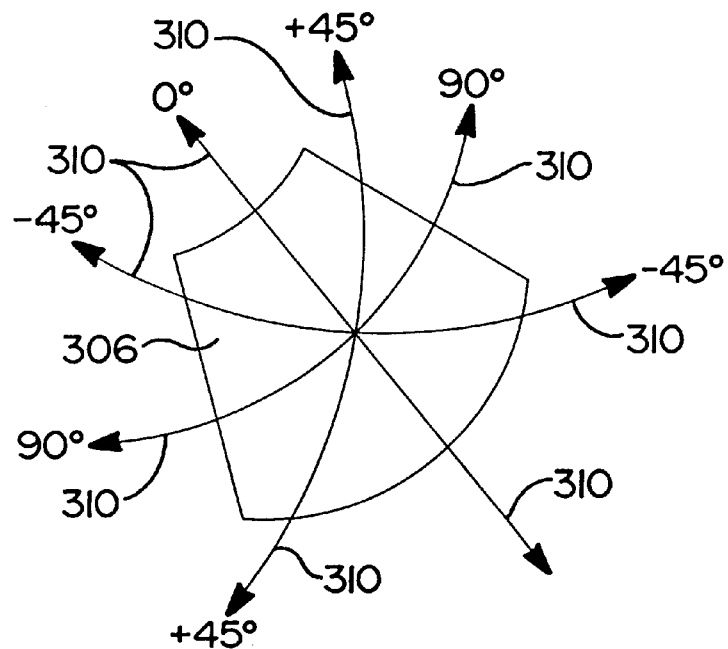
FIG 10  PSEUDO-ISOTROPIC

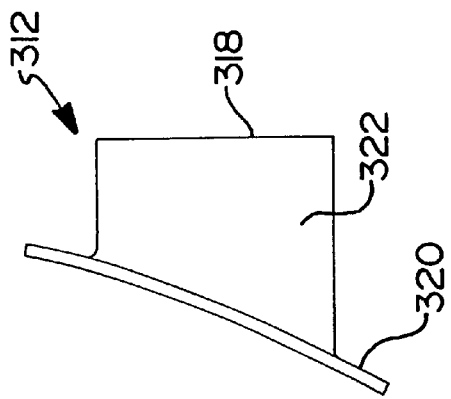
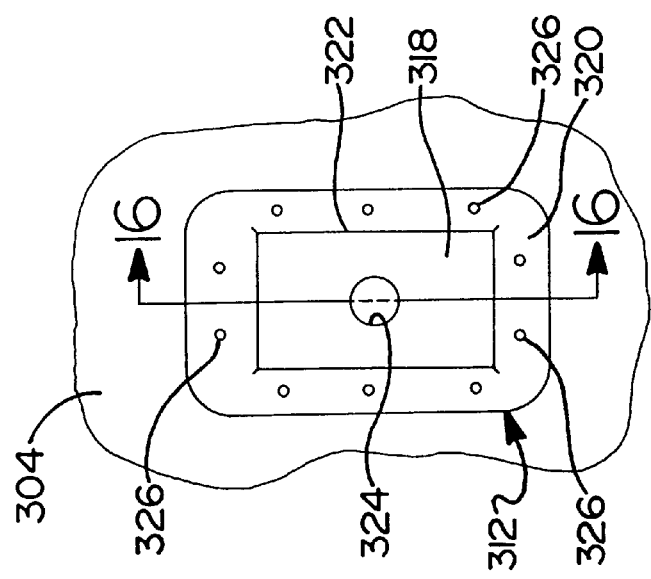
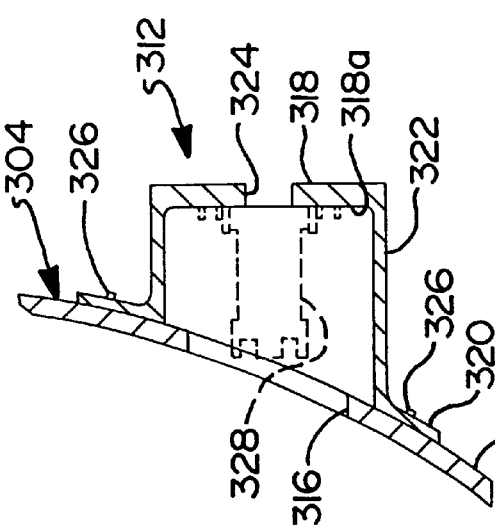

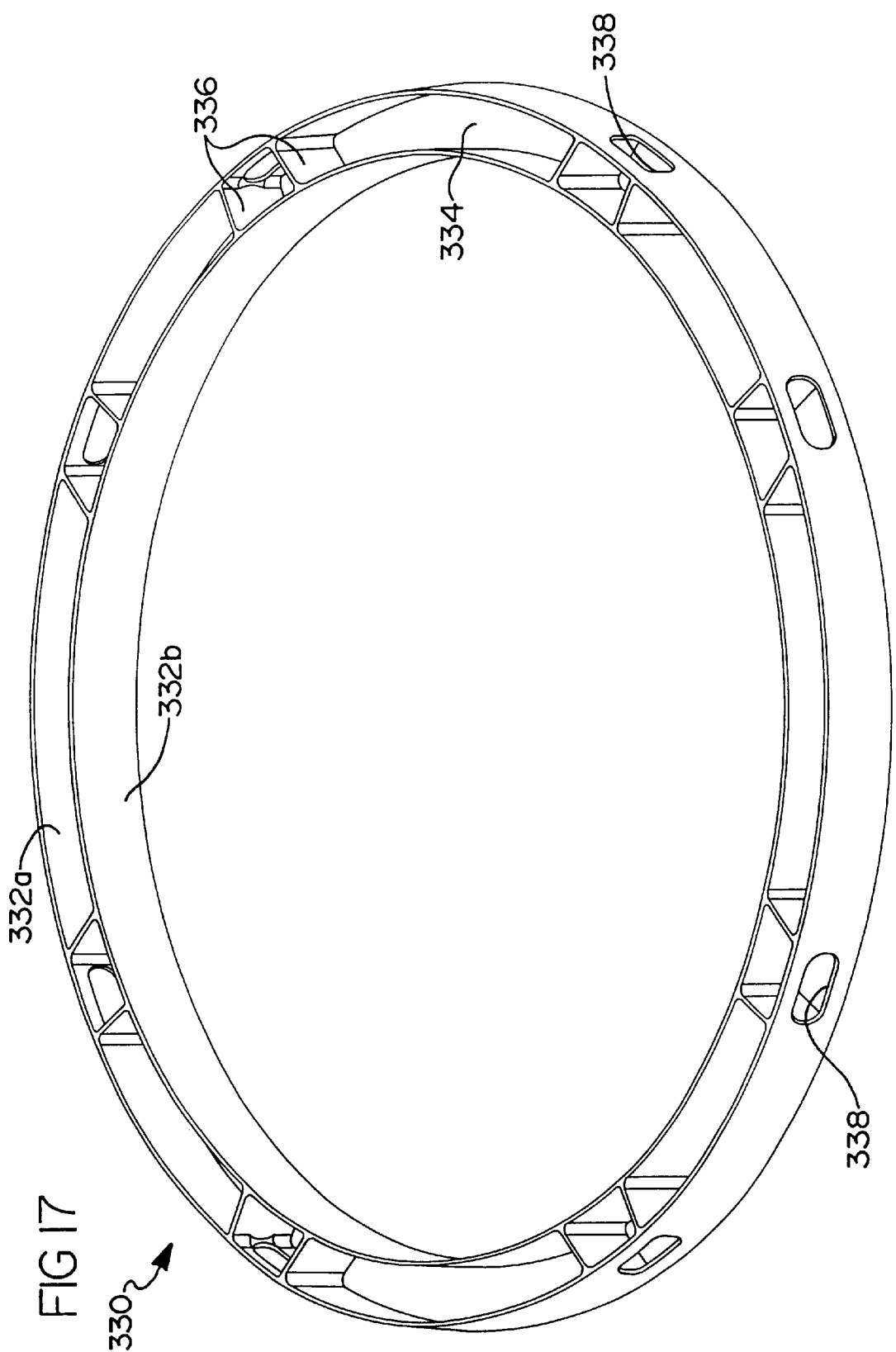

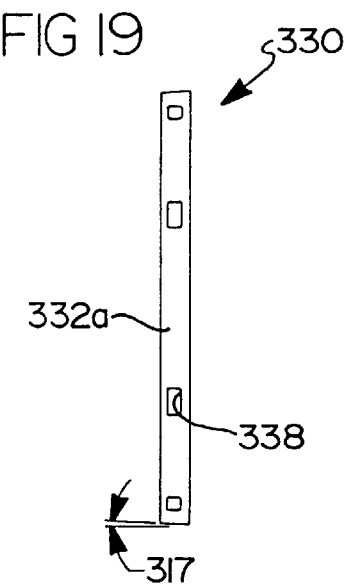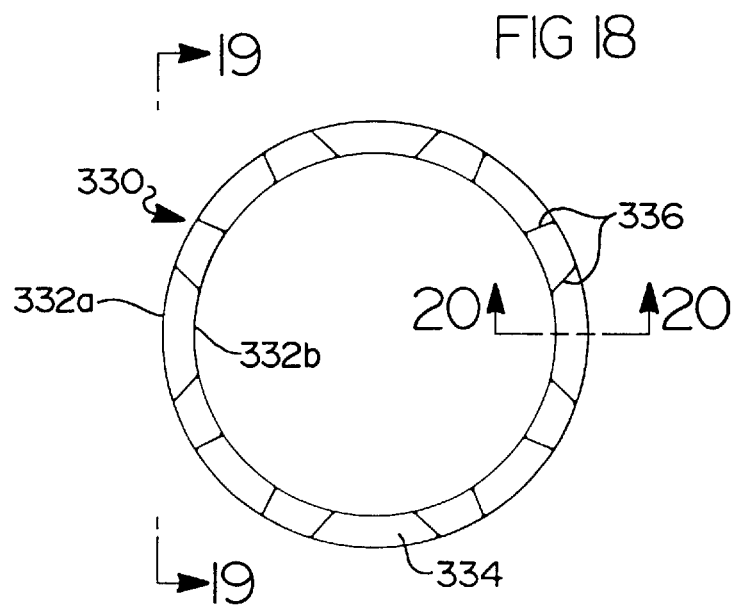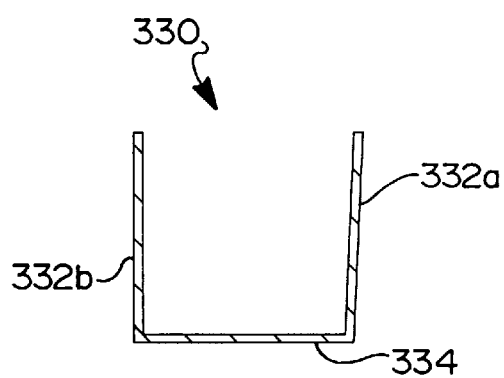

SATELLITE DISPENSER

CROSS REFERENCE TO RELATED APPLICATIONS

The present application is a continuation in part of U.S. application Ser. No. 08/715,128, filed Sep. 17, 1996, presently awaiting issue as U.S. Pat. No. 5,884,866 on Mar. 23, 1999.

BACKGROUND OF THE INVENTION

1. Technical Field

The present invention relates generally to an apparatus for deploying satellites in orbit and, more particularly, to a satellite dispenser that is selectively configurable to deploy multiple satellites from a single launch vehicle and which includes a single piece, integrally formed tubular dispenser shell.

2. Discussion

Launch vehicles used to deploy satellites in a predetermined orbit about the Earth commonly include a device that couples the satellites to the launch vehicle and that is adapted to release the satellites in response to a control signal. Recent technological advancements and market forces have changed the focus of satellite deployment from payloads of a single large satellite to multiple smaller satellites. More particularly, advancements in technology relating to satellite and launch vehicle design as well as orbital deployment techniques have allowed smaller industries and companies to enter the satellite market. Global network coverage provided by an array of small satellites is coveted by the communications industry and the market for scientific payloads is increasing in commercial significance.

The increased demand for small satellite deployment has given rise to previously unaddressed concerns regarding integration of multiple satellites on a single launch vehicle, as well as the continuing need to maximize the accuracy of satellite deployment. Existing deployment devices designed for a multiple satellite payload have proven to lack the desired flexibility in integrating the satellites with the launch vehicle. Rather, commonly used deployment devices accommodate a predetermined and limited number of satellites. These devices also fail to adequately accommodate the variety of sizes and weights of satellite payloads. Thus, a need exists for a multiple satellite dispenser that affords greater flexibility in the number, size, and weight of satellites which can be accommodated thereon for deployment.

An additional drawback with present day satellite deployment devices is the complexity, overall weight and cost of manufacturing of such devices. Present day satellite dispensers typically incorporate an elongated, multi-piece dispenser shell which is used to support a plurality of satellites thereon. For example, the apparatus of U.S. Pat. No. 5,884,886, while being well received in the industry, nevertheless incorporates two large, independent, tubular components which are secured together via a large diameter aluminum connecting ring. This connecting ring is also sometimes referred to in the art as a "kick ring".

The connecting ring is used to attach an elongated tubular post portion and a frusto-conical base portion together to form the dispenser shell which is used to support the satellites thereon. Since this structure is therefore quite large in diameter and length (often up to 35 feet in length (about 10.5 meters) and about 17 feet in diameter (about five meters) at the bottom of the base portion), this necessitates a large diameter connecting ring. The connecting ring can range in diameter from about three-eight feet (about one-three meters) and weigh in the range of 100 lbs–1500 lbs depending upon its overall dimensions.

As will be appreciated, manufacturing a dispenser having such large independent components involves significant and expensive manufacturing efforts. The large connecting ring and the two independent tubular members which it couples must be moved into precise alignment by large, expensive tooling. Tooling is also required to precisely locate and drill joint holes. Labor is required to drill and install fasteners for securing the three components together. Labor is also needed for fabricating and inspecting each of the large component parts. The cost of the aluminum connecting ring alone is a significant factor in the overall cost of manufacture of the satellite dispenser. Accordingly, the tooling and labor involved in manufacturing a multi-piece dispenser shell represents a major component of the overall cost of the satellite dispenser.

In addition to manufacturing complexities, the overall weight of the satellite dispenser is also an important factor which can limit the number of satellites that are carried into orbit by a launch vehicle. Since the total payload which must be considered is the weight of all of the satellites being carried on the dispenser plus the weight of the dispenser itself, it is critically important to minimize the weight of the dispenser without compromising structural rigidity and strength. Minimizing the weight of the dispenser helps to reduce the amount of fuel needed by the launch vehicle to propel any given number of satellites supported on the dispenser into orbit, or to enable larger and heavier satellites to be carried on the dispenser for a given amount of fuel.

Finally, it would be highly preferred, for structural strength and rigidity, to provide a dispenser apparatus which incorporates a single piece, tubular dispenser shell for supporting the satellites thereon. A single piece dispenser shell would provide even greater structural rigidity and resistance to axial bending forces while eliminating the need for a connecting ring, thus reducing its overall weight substantially.

SUMMARY OF THE INVENTION

The present invention provides a satellite dispenser adapted to deploy a variety of multiple satellite payloads in a simple and operationally efficient manner. The dispenser is adapted to be coupled to a launch vehicle which carries the satellite dispenser into orbit. Once into orbit, each satellite carried by the dispenser can be deployed at the desired point of travel in orbit.

In one preferred embodiment the present invention includes a post having a longitudinal axis, a base portion for coupling the post to a launch vehicle, and a plurality of attachment assemblies coupled to the post and having attachment assemblies for deployably (i.e., releasably) coupling one or more satellites to the post portion. The attachment assemblies define multiple points of attachment for each satellite carried by the post portion of the dispenser.

In another preferred embodiment the satellite dispenser comprises a single piece, integrally formed tubular dispenser shell for supporting one or more satellites thereon. The tubular shell includes a post portion and a base portion. The post portion includes a plurality of attachment assemblies for supporting one or more satellites independently thereon. The single piece tubular shell eliminates the need for a connecting ring for coupling the post and base portions together, thereby substantially reducing the cost and simplifying the manufacture of the dispenser shell. Eliminating the connecting ring also significantly reduces the overall weight of the satellite dispenser.

In the preferred embodiment the single piece tubular dispenser shell is manufactured from high modulus, composite graphite epoxy fibers which provide very high structural rigidity and stiffness in the longitudinal direction of the post portion. This serves to significantly improve the bending stiffness of the post portion. The resulting dispenser shell is extremely high in structural strength yet lighter in weight than dispensers incorporating two or more independent tubular or conical portions coupled by a connecting ring. The savings in weight increases the payload capacity of a launch vehicle carrying the satellite dispenser and its satellites into orbit.

In another alternative preferred embodiment, the satellite dispenser of the present invention incorporates a one-piece tubular dispenser shell having three conical sections each having a different degree of taper. The different degrees of taper serve to further enhance the overall structural strength of the structure as well as to enable a plurality of satellites to be more compactly supported on the structure.

BRIEF DESCRIPTION OF THE DRAWINGS

Other objects and advantages of the present invention will become apparent upon reading the following detailed description and upon reference to the drawings, in which:

FIG. 4 is a perspective view of a plurality of satellites coupled to a satellite dispenser according to another preferred embodiment of the present invention;

FIG. 5 is a plan view of the attachment fitting shown in FIG. 4;

FIG. 6 is a perspective view of the axial fitting shown in FIG. 4;

FIG. 7 is a plan view of an alternative embodiment of the attachment fitting;

FIG. 8 is a side view of an alternative preferred embodiment of the present invention incorporating a single piece tubular satellite supporting dispenser shell;

FIG. 9 is highly simplified view of circled portion 9 in FIG. 8 illustrating the orthotropic orientation of the fibers on the post portion of the dispenser shell;

FIG. 10 is a highly simplified view of circled portion 10 in FIG. 8 illustrating the pseudo-isotropic orientation of the fibers on the base portion of the dispenser shell;

FIG. 11 is a top plan view of the dispenser shell of FIG. 8;

FIG. 14 is a plan view of one interface fitting mounted on a portion of the post portion of the dispenser shell;

FIG. 15 is a side elevational view of the interface fitting shown in FIG. 14;

FIG. 16 is a cross-sectional side view of the interface fitting in accordance with section line 16—16 in FIG. 14;

FIG. 17 is a perspective view of one frame member of the present invention;

FIG. 18 is a plan view of the frame member of FIG. 17;

FIG. 19 is an elevational side view of the frame member of FIG. 18 taken in accordance with directional line 19 in FIG. 18;

FIG. 20 is a cross-sectional view of the frame member of FIG. 18 taken in accordance with section line 20—20 in FIG. 18;

DETAILED DESCRIPTION OF THE PREFERRED EMBODIMENTS

Figure 1:
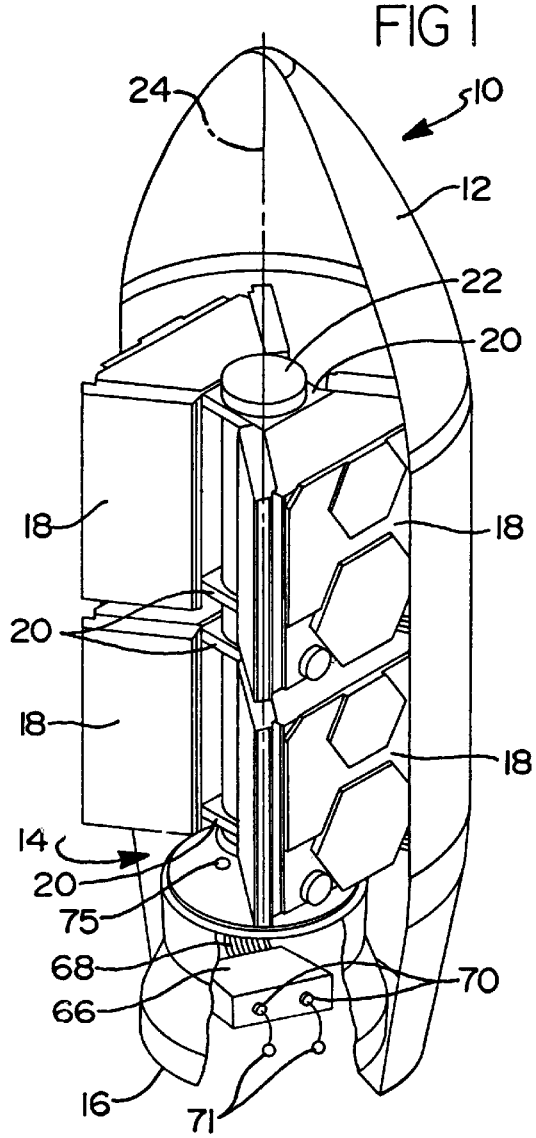
FIG. 1 is a perspective view of a plurality of satellites coupled to a satellite dispenser according to an embodiment of the present invention.

As illustrated in FIG. 1 of the drawings, a satellite deployment assembly 10 is generally shown to include a portion of a fairing 12 that in its entirety surrounds a satellite dispenser 14 in a manner known in the art. In this embodiment, dispenser 14 is coupled to a portion 16 of a launch vehicle (not shown) and specifically configured to support and deploy four satellites 18 in a manner described in detail hereinafter. Those skilled in the art will appreciate from the following description that satellite dispenser 14 is configurable to support a variety of satellite payloads differing in size, number, and weight simply by coupling various shaped fittings 20 to a dispenser post 22.

Figure 2:
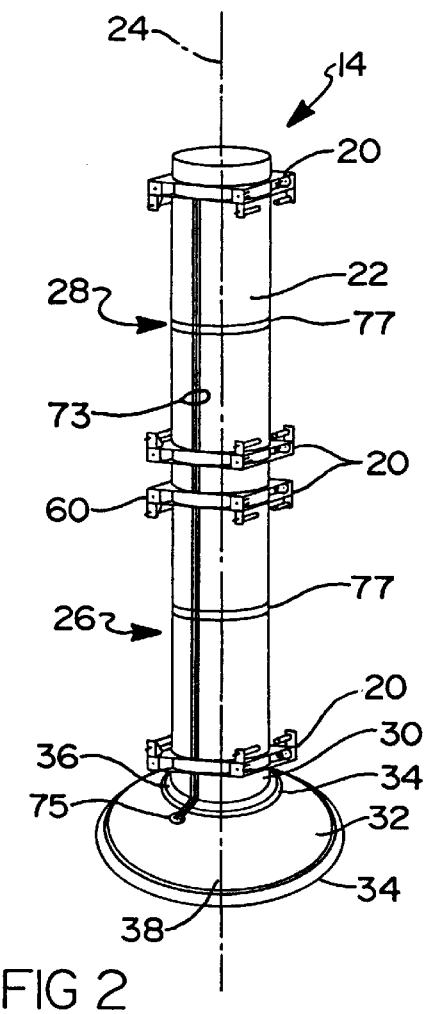
FIG. 2 is a perspective view of the dispenser illustrated in FIG. 1 with the payload and faring removed for clarity.

As illustrated in FIG. 2, post 22 preferably has a circular cross section and a longitudinal axis 24 about which fittings 20 are disposed and coupled to post 22 to extend radially therefrom and to define a plurality of satellite support bays. In the four satellite deployment configuration shown in FIG. 2, fittings 20 are disposed about the periphery of post 22 and coupled thereto, such as by an adhesive bonding or bolting, in a position defining lower satellite support bay 26 and upper satellite support bay 28. Aluminum fittings 34, preferably machined from an aluminum plate or cast, are disposed on both a forward portion 36 and an aft portion 38 of conical adaptor 32 and adhesively and mechanically bonding a first end 30 of post 22 to adaptor 32 and dispenser 14 to the launch vehicle portion 16 as is generally illustrated in FIG. 1.

Dispenser post 22 and fittings 20 are shown in FIGS. 1 and 2 to accommodate multiple satellites which may be deployed from a single launch vehicle. The dispenser is configured to package the satellites for optimum utilization of the envelope defined by fairing 12. Those skilled in the art will appreciate that while post 22, fittings 20, and adaptor 32 may be constructed of either aluminum or composite, a composite design is preferred. More particularly, post 22 is preferably a filament wound tube with a pattern that includes zero degree, ninety degree, and ± forty five degree windings and that is specifically tailored to achieve optimum stiffness. Conical adaptor 32 is also preferably formed of a composite skin such as zero degree, ninety degree, and ± forty five degree lay up.

Figure 3:
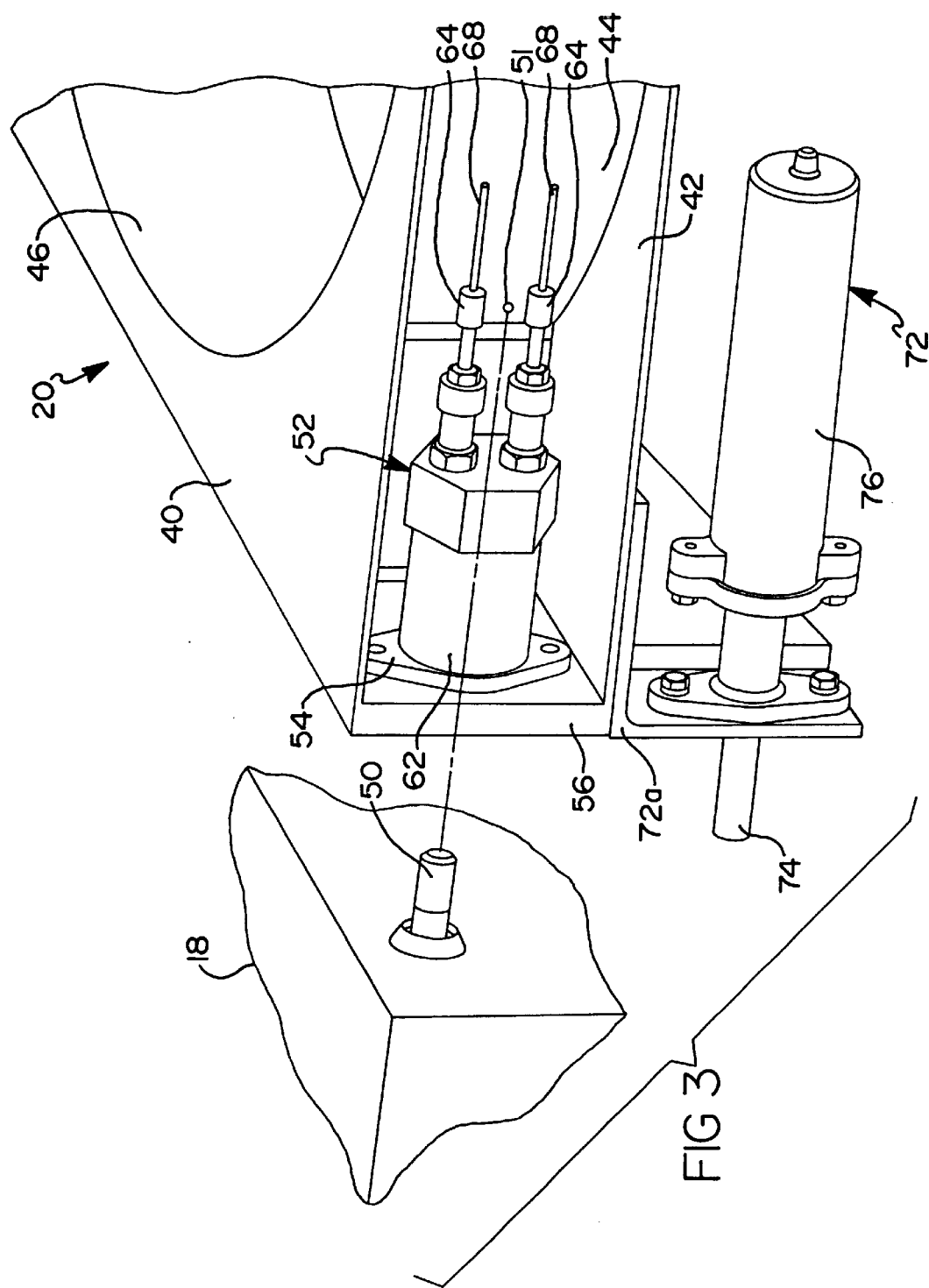
FIG. 3 is an enlarged perspective view of the dispenser fitting shown in FIG. 1 and illustrating an attachment and separation assembly of the satellite dispenser.

The height and diameter of post 22 is selected so as to accommodate the desired number of satellites to be deployed and to adapt to a variety of launch vehicle interfaces. More particularly, as further discussed hereinafter, it is contemplated that dispenser 14 is configurable to accommodate a variety of different numbers of similarly sized satellites using differently shaped fittings 20. For example, the square shaped fittings 20 shown in FIGS. 1–3 are disposable about post 22 to accommodate two or four satellites in each of the upper and lower satellite support bays 26 and 28, respectively, the triangular shaped fittings 120 illustrated in FIGS. 4 and 5 may be used to deploy multiples of three satellites, and the pentagonal shaped fittings 220 illustrated in FIG. 7 are contemplated for use when deploying five satellites per support bay. Those skilled in the art will appreciate that other fitting geometries may be used without departing from the scope of the invention as defined by the appended claims. The configuration and spacing of the fittings and the length and cross section of post 22 can also be varied to accommodate specific satellite interface requirements as well as satellites of differing sizes and weights.

In the present invention, fittings 20 are selectively configured to secure each of the plurality of satellites 18 to post 22 through a four point bolt and separation nut attachment assembly with each fitting 20 providing two points of the four point attachment. As is illustrated in FIG. 3, each fitting 20 generally includes an upper and lower planar member 40 and 42, respectively, interconnected by a cylindrical web 44. An inner surface 46 of web 44 defines a passage configured to cooperate with post 22 such that inner surface 46 frictionally engages the outer surface of post 22. However, those skilled in the art will appreciate that various equivalent structures for securing fittings 20 to post 22 may be used without departing from the scope of the appended claims.

As most clearly illustrated in FIG. 4, each satellite 18 is shown to include a connector bolt 50 extending from a corner 48 thereof to cooperate with a separation nut assembly 52 that defines an axis 51. A connector flange 54 of separation nut assembly 52 is connectable to a fitting flange 56 interconnecting upper and lower generally planar fitting members 40 and 42, respectively. Each fitting flange 56 defines a connector bolt passage 60 (FIG. 2) configured to accommodate connector bolt 50 of satellite 18. It should be appreciated that fittings 20 are positioned about post 22 such that each of the four connector bolts extending from a selected one of satellites 18 are alignable with a connector bolt passage defined by a pair of the respective fittings 20. Once properly aligned, satellite 18 is coupled to post 22 by urging satellite 18 along separation nut assembly axis 51 generally perpendicular to axis 24 of post 22.

Separation nut assembly 52 preferably includes a low shock separation device having a structure and operation generally known in the art. For example, a series SN9400 low shock separation nut manufactured by Hi-Scheer Technology Corp. of Torrance, Calif. may be used. Each separation nut assembly 52 generally includes a housing 62 coupled to or integral with flange 54 and connected to an initiator 64 which, as best illustrated in FIGS. 1 and 2, is operably connected to a manifold 66 by an explosive transfer assembly such as an insulated fuse 68 commonly known in the art. In the preferred embodiment, the plurality of fuses connecting manifold 66 to initiators 64 form a fuse cluster 73 passing through an aperture 75 formed in adaptor 32. Fuse cluster 73 is secured to post 22 via clamps 77.

Manifold 66 communicates with an electro-explosive device 70 that generates explosive gases in response to an electrical impulse communicated from the launch vehicle controller (not shown)along wires 71. The gases are transferred through manifold 66 to each of the plurality of fuse lines 68 connected thereto whereupon the increased temperature in manifold 66 ignites fuse lines 68. Fuse lines 68 burn from manifold 66 to initiator 64 of separation nut assemblies 52 and ignite initiator 64 to produce a gas that releases a locking device such as a piston disposed within nut housing 62.

With reference to FIG. 3, satellite 18 is propelled from fitting 20 by a separation actuator assembly 72 coupled to an angled member 73 of fitting 20. It will be appreciated that when satellite 18 is connected to post 22 at fitting 18, a piston rod 74 of actuator assembly 72 is axially displaced inwardly toward actuator assembly housing 76 thereby compressing a spring or other biasing device operably connected thereto. The force stored within the compressed biasing device within housing 76 is transferred to satellite 18 when separation nut assembly 52 releases connector bolt 50 as previously described. While the connection and deployment of satellite 18 has been described herein with reference to the single connector bolt 50, nut assembly 52, and actuator assembly 72, those skilled in the art will appreciate that similar assemblies are provided on each of the plurality of fittings 20 illustrated in FIG. 2 to provide the four point connection described herein.

As shown in FIGS. 1 and 3, satellite dispenser 14 preferably includes a pair of electro-explosive devices interconnected as previously described with a pair of initiators 64 on each separation nut assembly 52. This arrangement provides for redundant initiation of separation nut assembly 52 thereby minimizing the probability of initiation failure in response to control signals from the launch vehicle. Those killed in the art will appreciate that while the present description and the appended drawings describe an embodiment where all of satellites 18 are deployed by a single manifold 66, additional manifolds or a valving system for regulating the flow of pressurized gas in a multi-chambered manifold may be provided so as to deploy only certain of satellites 18 in response to predetermined control signals.

FIG. 4 illustrates an alternative satellite deployment assembly 110 wherein a plurality of triangular fittings 120 are coupled to a dispenser post to define upper and lower satellite support bays as previously described. In this embodiment, each of the upper and lower support bays allow the four-point connection of three satellites for deployment. As shown in FIG. 5, the configuration of fitting 120 defines a passage 146 cooperative with post 122 and accommodates separation nut assemblies and actuator assemblies 172 of the type and in the orientation relative to the longitudinal axis of dispenser post 122 as heretofore described. More particularly, when fitting 120 is coupled to post 122, the separation nut assembly and actuator assembly 172 define an axis generally perpendicular to the longitudinal axis of post 122.

FIGS. 4 and 6 illustrate that an axial fitting 180 is connectable to an upper end of post 122 thereby allowing dispenser 110 to accommodate an additional satellite 118 in the position shown in FIG. 4. Axial fitting 180 generally includes a cylinder 184 configured for bolted or adhesive attachment to post 122 and a four place separation nut and actuator assembly similar in design and configuration to that previously described. For example, FIG. 6 illustrates that a preferred embodiment of axial fitting 180 includes a fitting plate 186 connected to ring 184 and supporting a plurality of separation nut assemblies 152 and actuator assemblies 172 to define an axially extending satellite support bay.

Finally, FIG. 7 illustrates that various other configurations of the deployment assembly fittings may be used to deploy a variety of satellite payloads. The variety of usable fitting geometries allows an operator to configure the satellite dispenser of the present invention to deploy a variety of satellite payloads. Specifically, FIG. 7 shows a pentagonal shaped fitting 220 defining a passage 246 cooperative with the dispenser post shown in FIGS. 1–3 and actuator. In this embodiment, a plurality of fittings 220 are securable to the post to define satellite support bays accommodating five satellites.

Referring now to FIG. 8, a satellite dispenser 300 in accordance with an alternative preferred embodiment of the present invention is illustrated. The satellite dispenser 300 includes a single piece, large, integrally formed tubular dispenser shell 302 for supporting a plurality of independent satellites thereon. The tubular shell 302 includes a post portion 304 and a base portion 306. The post portion 304 can comprise a frusto-conically shaped structure or a cylinder having a constant cross-sectional area, as will be described in connection with the following preferred embodiments. If a frusto-conically shaped post portion 304 is employed, the angle of taper is preferably between one and five degrees, and more preferably about three degrees, as indicated by dimensional arrows 305. This degree of taper further enhances the structural rigidity of the shell 302 and also helps to provide a more compact envelope when the shell 302 is fully loaded with satellites. A lower ring assembly is comprised of an aluminum ring member 303 which is fixedly secured to a bottom edge 306a of the base portion 306. The lower ring assembly 303 is secured to a portion of a launch vehicle 307 to fixedly secure the dispenser 300 to the launch vehicle.

A highly important factor in the design of a multiple satellite dispenser such as dispenser 300 is the lateral natural frequency of the combination of the satellites and the dispenser shell 302. In general, this frequency needs to be kept relatively high so that it never couples with the dynamic loads that are expected in a launch environment. Basically, the bending stiffness of the dispenser shell 302 should be very high and its mass should be low.

There are four main factors that must be considered to achieve high bending stiffness. First, the shape of the dispenser shell has a large influence on bending stiffness. A large diameter cylinder can have a very large moment of inertia, but it is not particularly weight efficient. The top end 302b of the one-piece tubular shell 302, in part because of its taper, has a relatively small diameter, small moment of inertia and small surface area. This results in an extremely efficient configuration because this area has little influence on the overall stiffness of the dispenser shell 302.

At the bottom 302a of the shell 302 there is a large diameter, a large moment of inertia and large surface area. This configuration is appropriate because this part of the tubular shell 302 contributes significantly to its overall stiffness. The toroidal blend at area 302c of the shell 302 is also highly important because it enables the load from the satellites mounted on the post portion 304 to be distributed and directed smoothly into the base portion 306. This induces less local bending than a sharp or abrupt transition from a cylindrical post portion to a base having a frusto-conical shape. The single piece dispenser shell 302, whether having a cylindrical or frusto-conically shaped post portion, is also inherently stiffer than a multi-piece configuration due to the joint compliance or flexibility at the interface point of the post and base portions.

Second, the Young's modulus of the fiber used in a composite shell is an important contributing factor to the bending stiffness of the dispenser shell 302. The use of a stiff graphite epoxy fiber, as will be explained further, can significantly increase the stiffness of the shell 302.

Third, the orientations of the fibers used to form the dispenser shell 302 drive the lateral natural frequency of the shell. It has been determined that for optimal bending stiffness, that: 1) the post portion 304 should have a high percentage of fibers in the longitudinal direction (i.e., extending generally parallel to the longitudinal axis of the post portion 302, as indicated by reference numeral 308 in FIG. 8); 2) the toroidal blend area 302c of the shell 302 should have a pseudo-isotropic orientation of fibers; and 3) the base portion 306 should also have a pseudo-isotropic orientation of fibers.

Fourth, the lower the center of gravity of the system (i.e., the satellites and dispenser), the greater its natural frequency.

The dispenser shell 302 of the present invention is formed by high modulus composite graphite epoxy fibers via a well known fiber placement system which makes use of robotic machines to lay down the fibers in the desired orientations. It will be appreciated, however, that the fibers could be laid down by hand, but the use of robotic machines significantly speeds up the manufacturing process and improves the accuracy in the placement of the fibers.

The fibers are arranged "orthotropically" over the post portion 304. The orientation of the fibers is illustrated in highly simplified fashion in FIG. 9, with the fibers being designated by reference numeral 310. By "orthotropically" it is meant that at any given point on the post portion 304, the fibers 310 extend radially outwardly with the number of fibers 310 extending along the longitudinal axis of the post portion 304 (i.e., along directional arrow 308) being greater than the number extending non-parallel to directional arrow 308. In the present invention, it is strongly preferred that for every three fibers 310 that extends non-parallel to directional arrow 308, that about three-eight fibers, and more preferably about four fibers 310, extend parallel to directional arrow 308.

Referring briefly to FIG. 10, the pseudo-isotropic arrangement of the fibers 310 on the base portion 306 and the toroidal blend area 302c is shown in highly simplified form. With this arrangement, the fibers 310 are distributed such that at any given point an even number of fibers are radiating outwardly in various directions. As mentioned above, it is preferred that the toroidal blend area 302c and the base portion 306 each have fibers arranged in a pseudo-isotropic orientation.

Referring further to FIGS. 8 and 11–13, the post portion 304 includes a plurality of interface fittings 312 which are fixedly disposed on an outer surface 314 of the tubular shell 302. The fittings 312 are used to support the satellites on the post portion 304 of the tubular shell 302. The fittings 312 are disposed over a corresponding plurality of openings 316 formed in the tubular shell 302. With specific reference to FIGS. 11 and 13, the spacing of the fittings 312 circumferentially around the outer surface 314 of the tubular shell 302 can be seen in greater detail. The fittings 312 are arranged circumferentially about the outer surface 314, preferably in at least two rows, to thus form a plurality of pairs. It is contemplated that two pairs of fittings 308 will be required, in most instances, to support a single satellite. With the arrangement of fittings illustrated in FIG. 13, four satellites can be supported circumferentially around the post portion 304 of the dispenser shell 302. However, it will be appreciated that a greater or lesser number of pairs of fittings 312 could just as readily be arranged around the post portion 304 to support a correspondingly greater or less number of satellites.

With brief reference to FIGS. 14–16, each interface fitting 312 is preferably manufactured as a single piece component from either aluminum or titanium. Each comprises a planar face portion 318 and an arcuate flange portion 320 separated by a wall portion 322. The radius of curvature of the arcuate flange portion 320 is selected to match the radius of curvature of the outer diameter of the dispenser shell 302 at the longitudinal point on the post portion 304 where the fitting 312 is to be secured. It will be appreciated then that the fittings 312 that are to be disposed at the lower end of the post portion 304, when the post portion has a small degree of taper, will require a flange portion 320 having a slightly different radius of curvature than those fittings that are to be disposed at the upper end of the tapered post portion.

The face portion 318 includes an opening 324 to which a portion of an attachment structure of a satellite may project through. The flange portion 320 is connected preferably by threaded fasteners 326 to the post portion 304 of the dispenser shell 302 such that the opening 324 is aligned over an associated opening 316 in the shell 302. A separation nut 328 is inserted through the opening 316 in the tubular shell 302 from the interior area of the shell 302 by a worker and secured to an inner surface 318a of the face portion 318 by suitable threaded fasteners. The separation nut 328 forms a part of a separation assembly, such as that described in connection with the embodiment of FIGS. 1–7, for controllably deploying (i.e., releasing) the satellite attached thereto at a predetermined point of travel of the launch vehicle.

Referring to FIGS. 12 and 17–20, the tubular shell 302 further includes a plurality of frames 330 secured to an inner surface 302d thereof. The frames 330 each comprise generally U-shaped components which are manufactured as single piece components, preferably from aluminum or any other material which is light in weight yet structurally strong.

Figure 12:
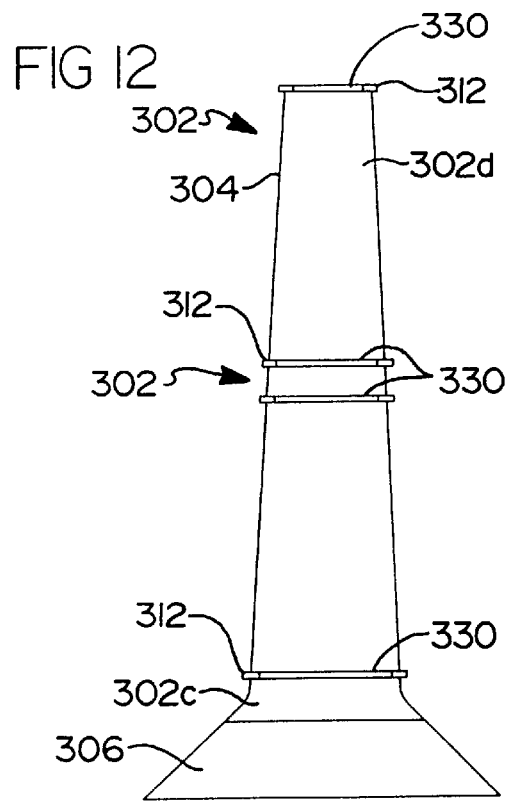
FIG. 12 is a cross-sectional side view of the dispenser shell of FIG. 11 taken in accordance with section line 12—12 in FIG. 11.
Figure 13:
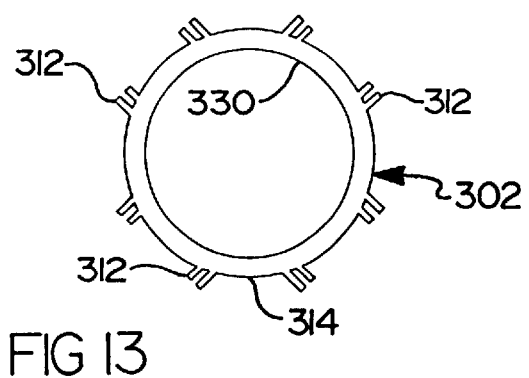
FIG. 13 is a cross-sectional top view of only the post portion of the dispenser shell of FIG. 8 taken in accordance with section line 13—13 in FIG. 8.

As shown in FIG. 12, the frames 330 are spaced apart along the longitudinal length of the post portion 304 and are secured by threaded fasteners or other suitable fasteners (not shown), for example rivets, or alternatively via a suitable adhesive used solely or in connection with other mechanical fasteners, so as to form a plurality of rows. The frames 330 assist in stiffening the tubular shell 304 and provide a means to which each of the interface fittings 312 can be further attached.

With specific reference to FIGS. 17–20, the frame 330 includes a pair of generally parallel wall portions 332a and 332b joined by a wall portion 334. A plurality of ribs 336 are integrally formed between the wall portions 332a and 332b to provide excellent structural rigidity to the frame 330. Wall portion 332b includes a plurality of circumferentially spaced apart openings 338. The openings 338 are spaced apart so as to align with one row of openings 316 in the dispenser shell 302. In this regard it will be appreciated that each frame 330 has a precise outer diameter that enables it to be fitted within the interior area of the post portion 304 of the shell 302 at precisely the desired longitudinal position thereon such that the openings 336 align with the openings 316. This enables the separation nuts 328 to inserted through the openings 338 and 316 and coupled to the interface fittings 312. The wall portion 332a also includes a small degree of taper, as indicated by arrows 317 in FIG. 19, which matches the taper of the post portion 304. This enables the wall portion 332 to fit flush against the inner surface 302d of the post portion 302. The longitudinal spacing of the frames 330 is such that one pair of frames is used to help support two or more satellites along an upper half of the post portion 304, and a second pair of frames 330 is used to support two or more satellites on the lower half of the post portion 304. It will be appreciated, however, that more than two rows of satellites could readily be supported on the post portion 304 provided a suitable number of frames 330 are employed, and further provided that the overall length of the post portion 304 is sufficient to accommodate the cumulative longitudinal lengths of the satellites.

Figure 21:
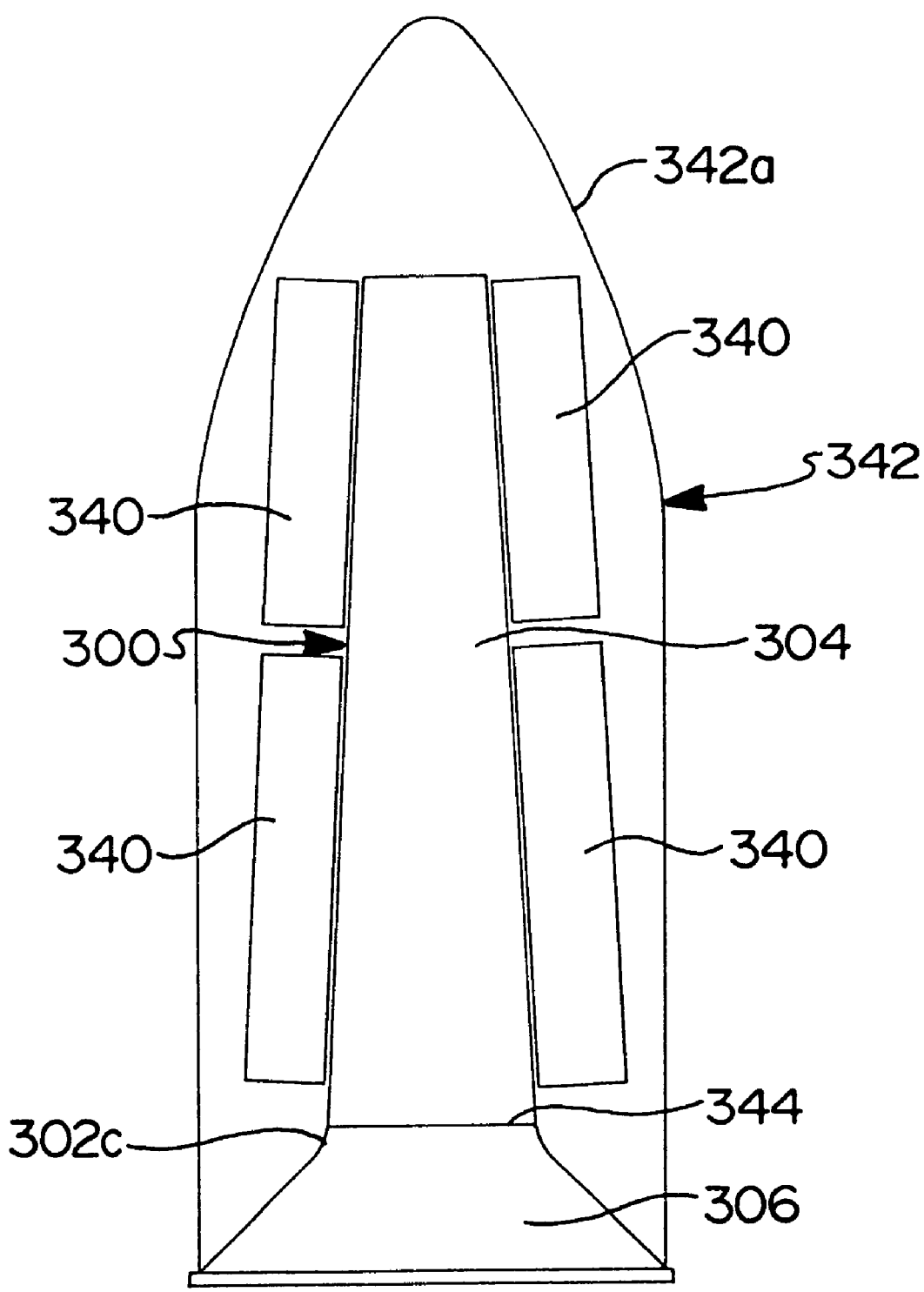
FIG. 21 is a side, partial cross-sectional view of the satellite dispenser of FIG. 8 carrying a plurality of satellites thereon.

Referring now to FIG. 21, the satellite dispenser 300 is illustrated supporting a plurality of satellites 340 thereon. The envelope formed by the satellites 340 and the dispenser 300 is compact and easily covered by an aerodynamically shaped fairing 342. As will be appreciated from FIG. 21, the taper of the post portion 304 enables the upper ends of the two or more upper satellites 340 to be disposed higher within the nose area 342a of the fairing 342. This enables a shorter, and therefore lighter, fairing 342 to be used.

FIG. 21 also discloses a diaphragm 344 which is comprised of a composite disc. The diaphragm 344 is used as a partition to separate the interior area of the dispenser 300 into two compartments. As with previous designs of tubular satellite dispensers, the area within the dispenser 300 above the diaphragm 344 is sometimes purged with conditioned air while the area below the diaphragm is purged with nitrogen. The use of the diaphragm 344 depends upon the specific design of the launch vehicle and is not a critical feature of the design of the satellite dispenser 300.

Figure 22:
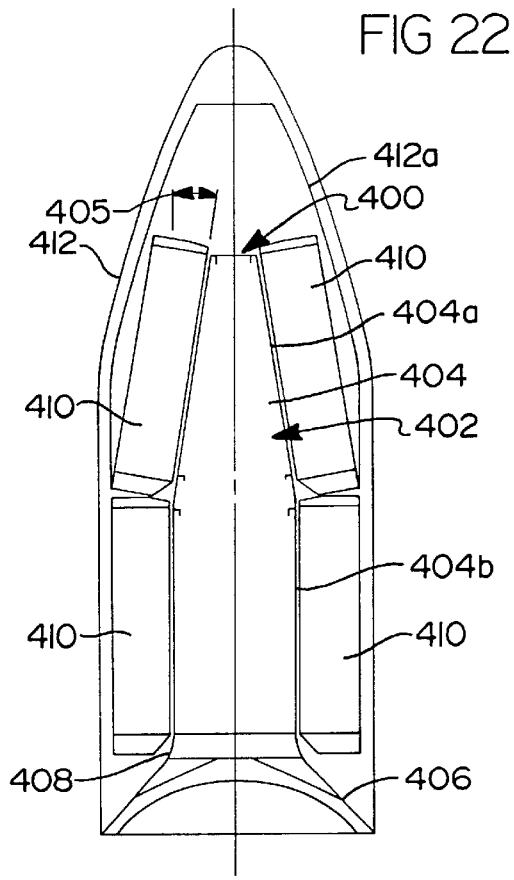
FIG. 22 is a side, partial cross-sectional view of a satellite dispenser in accordance with an alternative preferred embodiment of the present invention carrying a plurality of satellites thereon.

Referring to FIG. 22, a satellite dispenser 400 in accordance with an alternative preferred embodiment is shown. The dispenser 400 includes an integrally formed, one-piece tubular dispenser shell 402 having a post portion 404 and a base portion 406 separated by a toroidal connecting or transition portion 408. The dispenser 400 is essentially identical in construction to the dispenser 300 with the exception that the post portion 404 includes an upper section 404a having a degree of taper and a lower section 404b which forms a cylinder of constant cross-sectional area. The taper of the upper section 404a is preferably within the range of about 5–15 degrees, as indicated by arrows 405, and more preferably about nine degrees. The taper of the upper section 404a enables the upper satellites 410 being supported on the post portion 404 to be disposed further up into the nose portion 412a of a fairing 412. The taper of the base portion 406 may vary considerably, but is preferably around 45 degrees. The transition portion 408 is toroidal and forms a smooth, curving transition area to help distribute loads evenly throughout the base portion 406.

Figure 23:
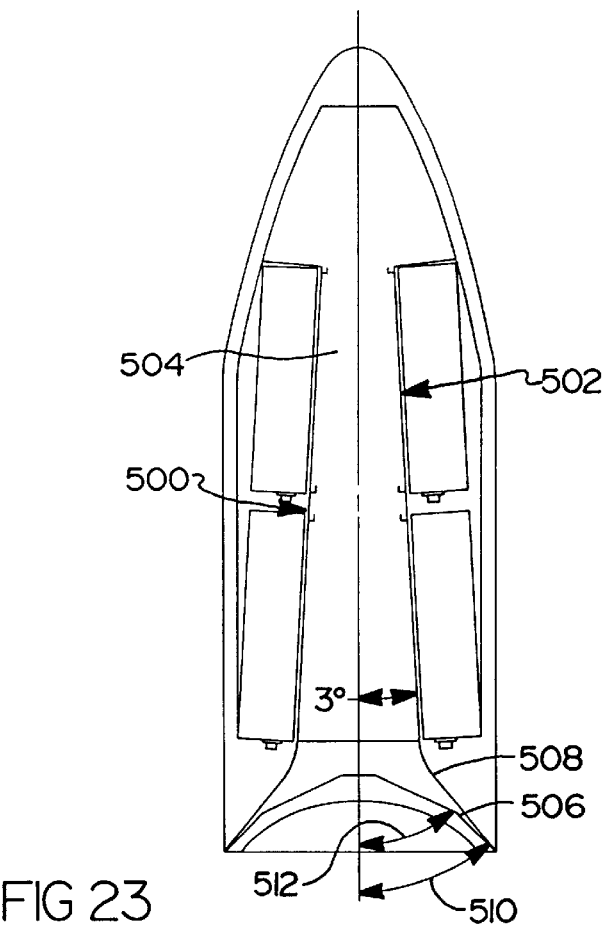
FIG. 23 is a side, partial cross-sectional view of a satellite dispenser in accordance with another alternative preferred embodiment of the present invention.

Referring now to FIG. 23, a satellite dispenser 500 in accordance with another alternative preferred embodiment of the present invention is shown. The dispenser 500 includes an integrally formed, single-piece tubular shell 502 which is also manufactured from high modulus, composite graphite epoxy fibers in a manner as described in connection with the dispenser 300 of FIG. 8. The tubular shell 502, however, includes a "tri-conic" configuration comprised of an elongated, frusto-conical post portion 504, a frusto-conical base portion 506, and a frusto-conical transition section 508. The post portion 504 has a taper of preferably between about one-five degrees, and more preferably about three degrees. The base portion 506 has a taper of preferably between about 35–50 degrees, and more preferably about 45 degrees, as indicated by arrows 510. The transition section 508 has a taper of preferably between about 30–50 degrees, and more preferably about 40 degrees, as indicated by arrows 512. It has been found that incorporating one or more distinct, frusto-conical transition sections between the post portion 504 and the base portion 506 serves to even more effectively distribute the loading on the post portion 504 to the base portion 506. It is further anticipated that the base portion 506 could be formed from a single, gradual parabolic shaped portion extending from a lower edge of the post portion 504. It is expected that such a shape will even further enhance the transfer of load forces evenly throughout the base 506 and further enhance the stiffness of the entire tubular shell 502.

Figure 24:
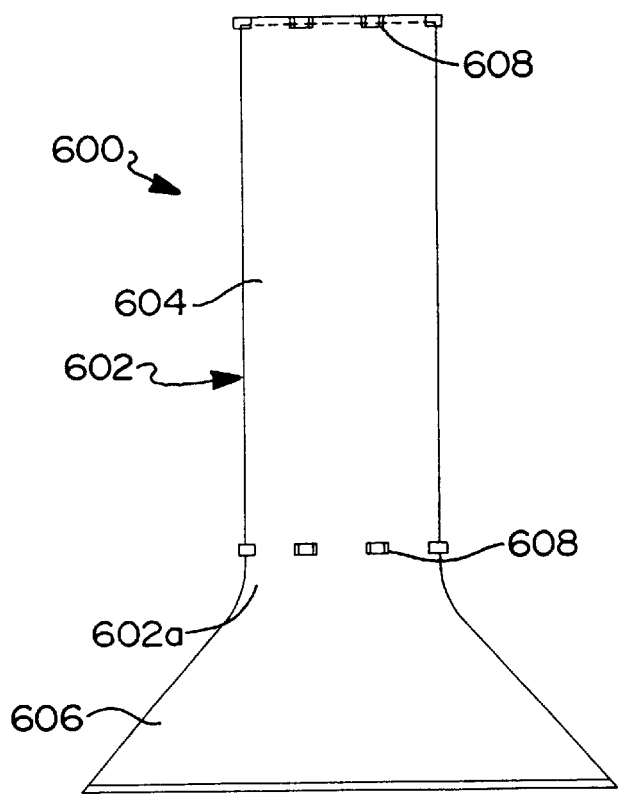
FIG. 24 is a side elevational view of a satellite dispenser apparatus in accordance with another alternative preferred embodiment of the present invention.
Figure 25:
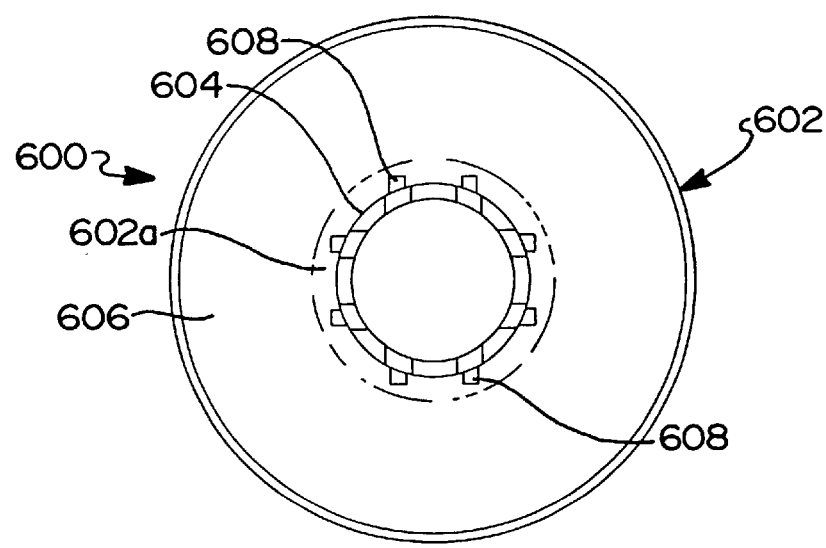
FIG. 25 is a top plan view of the dispenser apparatus of FIG. 24.

Referring now to FIGS. 24 and 25, yet another satellite dispenser 600 is illustrated in accordance with another alternative preferred embodiment of the present invention. The dispenser 600 includes a single piece, integrally formed tubular dispenser shell 602. The shell 602 includes a cylindrical post portion 604 having a constant cross-sectional area and a frusto-conical base portion 606. The post portion 604 and the base portion 606 are coupled by a toroidal section 602a which evenly disperses the load of the post portion 604 and the satellites carried thereon (not shown) onto the base portion 606. This embodiment includes a shorter post portion 606 than the previously discussed embodiments and is adapted to support only a single row of satellites via two rows of interface fittings 608.

It will be appreciated that each of the embodiments of FIGS. 22–25 each include a plurality of frames, such as frame 330 described in connection with FIGS. 17, 18 and 20, as well as a plurality of interface fittings, such as fittings 312. Each embodiment of FIGS. 8–25 is manufactured from high modulus, composite graphite epoxy fibers through a well known fiber placement system. This provides a weight savings in the range of about 1200 lbs–1800 lbs over multi-piece dispenser shells that require a connecting ring to secure the post portion to the base portion. This significantly increases the useful payload that the satellite dispenser can carry without requiring additional fuel for the launch vehicle. The single-piece configuration of the embodiments of FIGS. 8–25 further provide significantly increased bending resistance and overall structural rigidity to better withstand the forces imposed by the cumulative load of the satellites being carried and the forces experienced by the dispenser shell during flight through the Earth's atmosphere. The close mounting of the satellites to the outer surface of the dispenser also minimizes the loads experienced by the dispenser shell.

Each of the preferred embodiments also requires less labor and tooling to manufacture, and therefore represents a significant cost savings over multi-piece dispensers requiring a connecting ring. Also, it will be appreciated that the dimensions given in various ones of the drawing figures are for exemplary purposes only, and that the dimensions of the various components of the preferred embodiments may vary considerably from those given in the drawings.

Various other advantages of the present invention will become apparent to those skilled in the art after having the benefit of studying the foregoing text and the appended drawings, taken in construction with the following claims:

What is claimed is:

1. A satellite dispenser for supporting a plurality of satellites, and adapted to be carried into the Earth's orbit by a launch vehicle, said satellite dispenser comprising:
   single piece shell including a post portion, an integrally formed base portion, and a toroidal portion forming a smooth, blended transition between said base portion and said post portion, said single piece shell having a length-wise dimension sufficient to span at least one satellite disposed longitudinally along said post portion; and
   frame secured to said single piece shell adapted to assist in supporting said satellite.

2. The satellite dispenser of claim 1, further comprising a lower ring assembly secured to a peripheral edge of said base portion, for securing said single piece shell to a portion of said launch vehicle.

3. The satellite dispenser of claim 1, further including a separation assembly including a separation nut adapted to separate from said frame to thereby release said one satellite for deployment from said satellite dispenser.

4. The satellite dispenser of claim 1, further comprising:
   a separation assembly;
   wherein said single piece shell includes an inner surface and an outer surface; said frame being secured to said inner surface; and
   said frame comprising a generally U-shaped, circumferential member having a plurality of openings formed therein for receiving and coupling with a portion of said separation assembly.

5. The satellite dispenser of claim 4, wherein said U-shaped, circumferential member comprises a single piece, circular frame member.

6. The satellite dispenser of claim 1, wherein said frame comprises a generally U-shaped, circumferential frame member having an inner wall spaced apart from a concentrically disposed outer wall; and
   said inner and outer walls being joined by a plurality of ribs coupled therebetween to provide a rigid frame member.

7. The satellite dispenser of claim 6, wherein said frame comprises a plurality of circumferentially spaced apart holes formed in said outer wall thereof.

8. The satellite dispenser of claim 1, wherein said post portion and said base portion each comprise a truncated conical member.

9. The satellite dispenser of claim 1, wherein said post portion comprises a cylindrical member and said base portion comprises a truncated conical member.

10. A satellite dispenser for supporting and deploying a plurality of satellites, and being adapted to be carried into the Earth's orbit by a launch vehicle, said satellite dispenser comprising:
   a single piece tubular shell including a post portion, an integrally formed base portion, and a toroidal portion forming a smooth, blended transition between the base portion and the post portion, said post portion having a length-wise dimension sufficient to span at least one pair of satellites disposed longitudinally in line with one another along said post portion;
   a pair of frame members secured to said post portion and spaced apart from one another longitudinally along said post portion, said frame members being adapted to assist in supporting at least one of said pair of satellites at two spaced apart locations thereon; and
   a separation assembly operably associated with said frame for releasably coupling one of said pair of satellites to said single piece tubular shell and for deploying said one satellite at a desired point of travel of said launch vehicle.

11. The satellite dispenser of claim 10, wherein said single piece tubular shell is manufactured from high modulus, composite graphite epoxy fibers.

12. The satellite dispenser of claim 10, wherein said post portion comprises a conically shaped, single piece component.

13. The satellite dispenser of claim 12, wherein said conical shape of said post portion includes a taper of about three degrees.

14. The satellite dispenser of claim 10, wherein said post portion comprises a cylindrical tube-like member having a constant cross-sectional internal area.

15. The satellite dispenser of claim 10, wherein at least one of said frame members comprises a single piece component having a generally U-shape when viewed in cross section, and a plurality of openings spaced therearound.

16. The satellite dispenser of claim 10, wherein said separation assembly includes at least one separation fitting secured to an outer surface of said post portion, said separation fitting supporting a separation nut adapted to be secured to a portion of one of said satellites, said separation nut being operable to release said satellite for deployment at said desired point of travel of said launch vehicle.

17. The satellite dispenser of claim 16, wherein a plurality of pairs of said separation fittings are secured to said outer surface of said post portion and spaced circumferentially about said outer surface such that each pair of said separation fittings is used to independently support one said satellite for controlled deployment.

18. A satellite dispenser for supporting and deploying a plurality of satellites, and being adapted to be carried into the Earth's orbit by a launch vehicle, said satellite dispenser comprising:

a single piece tubular shell including a post portion, an integrally formed base portion, and a toroidal blend portion forming a smooth, blended transition between said base portion and said post portion, said post portion having a length-wise dimension sufficient to span at least one pair of satellites disposed longitudinally in line with one another along said post portion;

said tubular shell being formed from high modulus material;

said post portion having at least a section thereof having a taper;

a pair of frame members secured to said post portion and spaced apart from one another longitudinally along said post portion, said frame members being adapted to assist in supporting at least one of said pair of satellites at two spaced apart locations thereon; and each said frame member having at least one separation assembly for releasably coupling one of said satellites to said single piece tubular shell and for deploying said one of said satellites at a desired point of travel of said launch vehicle.

19. A satellite dispenser for supporting and deploying a plurality of satellites, and adapted to be carried into the Earth's orbit by a launch vehicle, said satellite dispenser comprising:

a single piece shell including a post portion, an integrally formed base portion, and a toroidal blend portion integrally formed with said post portion and said base portion to provide a smooth, blended transition between said post portion and said base portion, said single piece shell having a length-wise dimension sufficient to span at least one satellite disposed along a longitudinal length of said post portion;

a frame secured to said single piece shell adapted to assist in supporting said satellite; and a separation assembly operably associated with said frame for releasably coupling said satellite to said single piece shell and for deploying said satellite at a desired point of travel of said launch vehicle.

20. The satellite dispenser of claim 19, wherein said longitudinal length of said post portion is sufficient to enable a pair of satellites to be disposed adjacent thereto.

21. The satellite dispenser of claim 19, wherein said post portion includes a taper.

22. The satellite dispenser of claim 19, wherein said single piece shell is formed from a high modulus material.

23. The satellite dispenser of claim 19, wherein said single piece shell is formed from high modulus, composite graphite epoxy fibers.

24. For a satellite dispenser, a satellite supporting shell comprising:

a post portion adapted to support at least one satellite adjacent thereto;

a base portion adapted to be secured to a launch vehicle; and wherein said post portion, said toroidal blend portion and said base portion are integrally formed such that said supporting shell forms a single piece component.

25. The satellite supporting shell of claim 24, wherein said shell is comprised of a high modulus material.

26. The satellite supporting shell of claim 24, further comprising at least one frame member for at least partially supporting at least one satellite on said post portion.

* * * * *

UNITED STATES PATENT AND TRADEMARK OFFICE
CERTIFICATE OF CORRECTION

PATENT NO.   : 6,416,018 B2
DATED        : July 9, 2002
INVENTOR(S)  : DiVerde et al.

It is certified that error appears in the above-identified patent and that said Letters Patent is hereby corrected as shown below:

<u>Column 6,</u>
Line 40, delete "killed" and insert -- skilled --.

<u>Column 10,</u>
Line 3, insert -- be -- after "to".

<u>Column 14,</u>
Line 42, after "and" insert -- a toroidal blend portion in between said post portion and said base portion for forming a gradually curving transition between said post and base portions --.
Line 43, before "wherein" insert -- and --.

Signed and Sealed this

Nineteenth Day of August, 2003

JAMES E. ROGAN
*Director of the United States Patent and Trademark Office*